Figure 1:
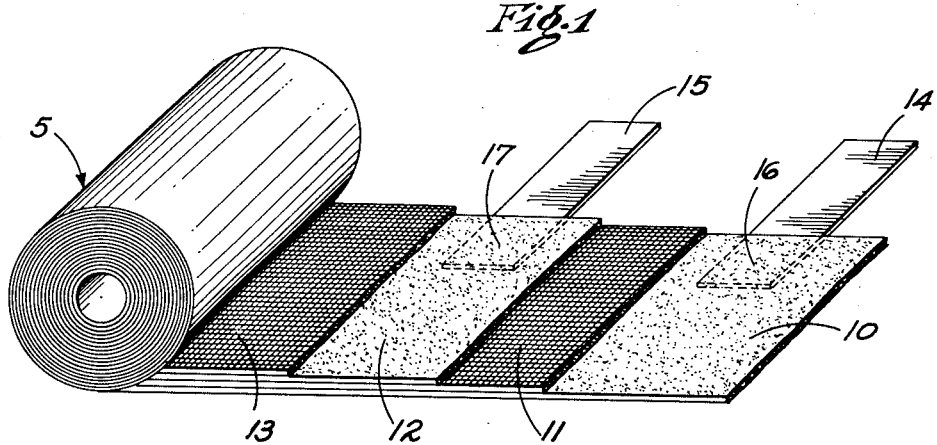

July 22, 1952     J. B. BRENNAN     2,604,517
ELECTRODE AND TERMINAL ASSEMBLY FOR ELECTROLYTIC
DEVICES AND METHODS OF MAKING SAME
Filed April 23, 1947     5 Sheets-Sheet 1

INVENTOR.
JOSEPH B. BRENNAN

BY
Bosworth + Sessions
ATTORNEYS

July 22, 1952 J. B. BRENNAN 2,604,517
ELECTRODE AND TERMINAL ASSEMBLY FOR ELECTROLYTIC
DEVICES AND METHODS OF MAKING SAME
Filed April 23, 1947 5 Sheets-Sheet 2
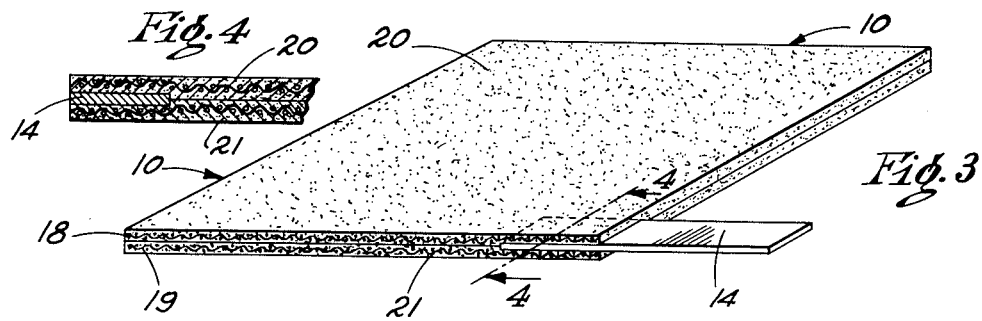
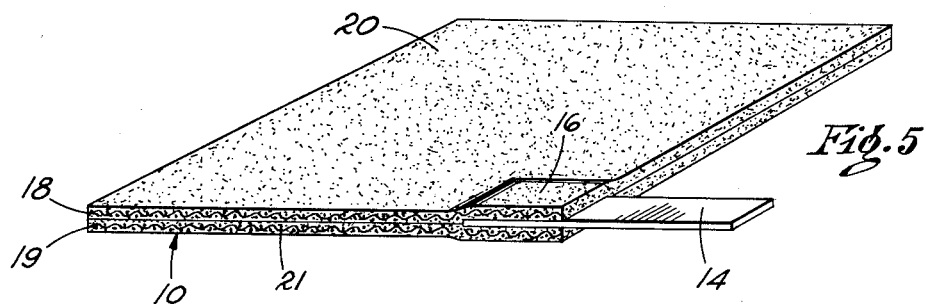
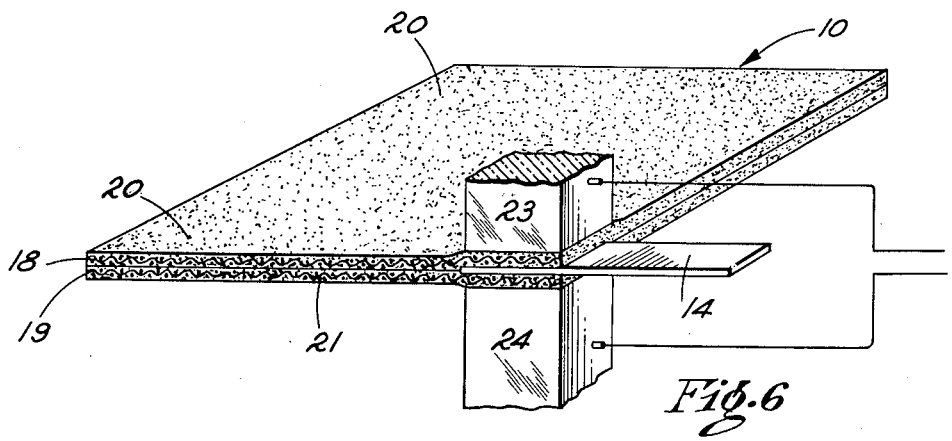
INVENTOR.
JOSEPH B. BRENNAN
BY Bosworth & Sessions
ATTORNEYS July 22, 1952 J. B. BRENNAN 2,604,517
ELECTRODE AND TERMINAL ASSEMBLY FOR ELECTROLYTIC
DEVICES AND METHODS OF MAKING SAME
Filed April 23, 1947 5 Sheets-Sheet 3
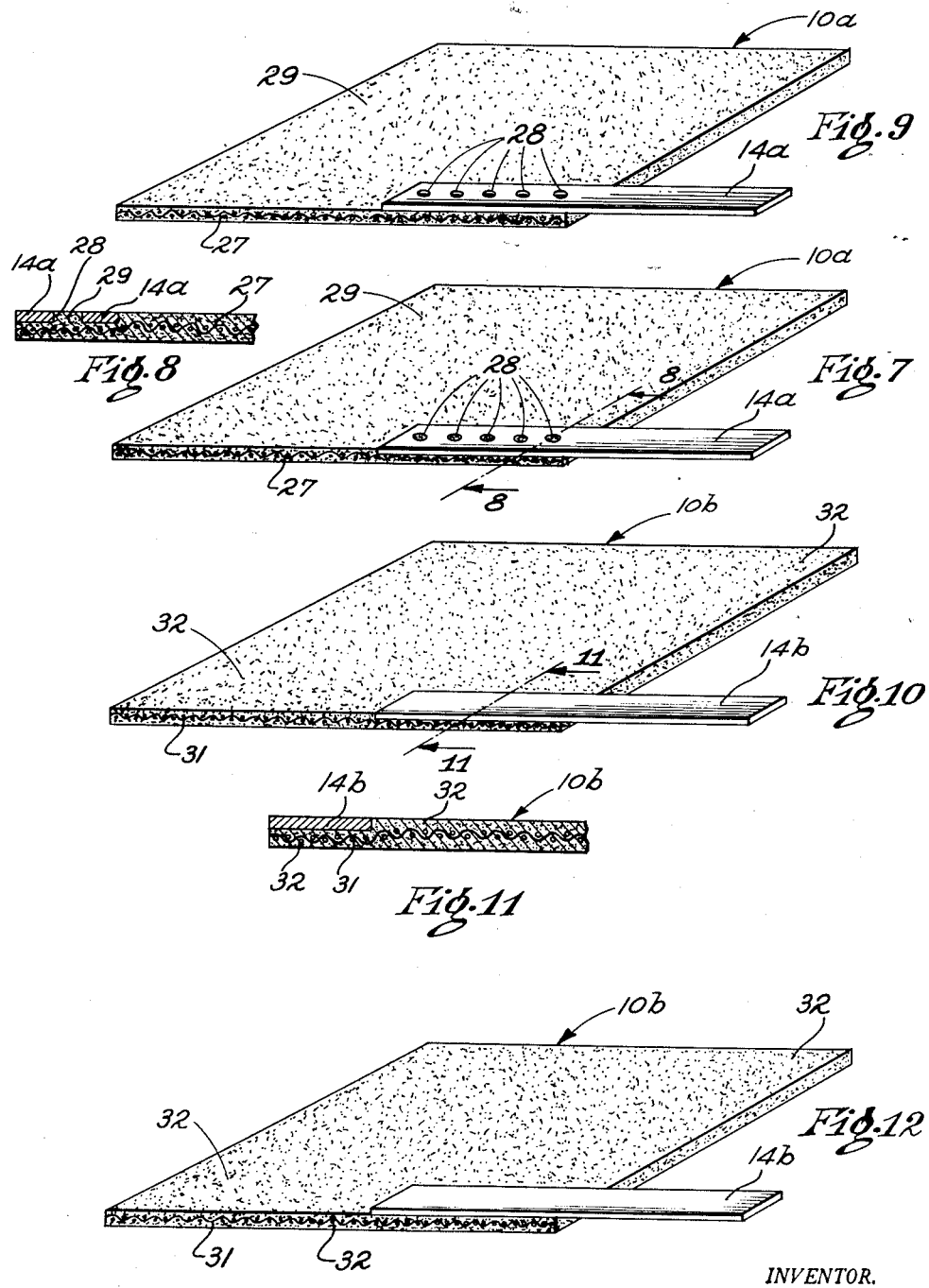
INVENTOR.
JOSEPH B. BRENNAN
BY
ATTORNEYS

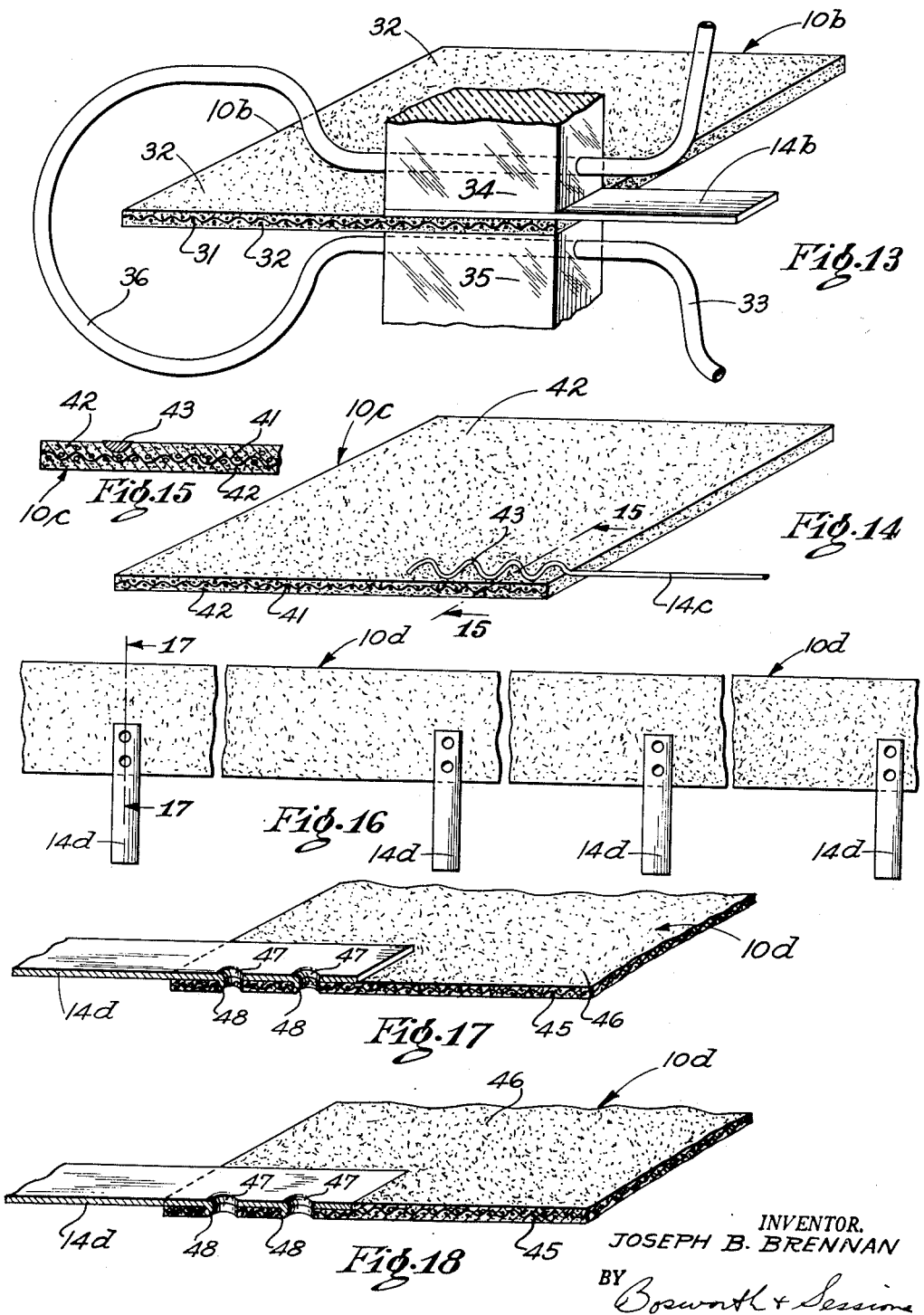

INVENTOR.
JOSEPH B. BRENNAN
ATTORNEYS

Patented July 22, 1952

2,604,517

UNITED STATES PATENT OFFICE 2,604,517

ELECTRODE AND TERMINAL ASSEMBLY FOR ELECTROLYTIC DEVICES AND METHODS OF MAKING SAME

Joseph B. Brennan, Bratenahl, Ohio, assignor to Everett D. McCurdy, trustee

Application April 23, 1947, Serial No. 743,374

15 Claims. (Cl. 175—315)

1

This invention relates to electrode and terminal assemblies for electrolytic devices such as electrolytic condensers, rectifiers, lightning arresters and the like, and is described herein with reference to electrolytic condensers of the type embodying one or more electrodes having surfaces of film-forming metal immersed in an electrolyte of the viscous or paste type; i. e., so-called dry electrolytic condensers.

Such condensers frequently comprise assemblies of flexible strip electrodes and intervening separators rolled or wound into substantially cylindrical form. Another common form of condenser consists of a stack of substantially flat electrodes and intervening separators, alternate electrodes being of opposite polarity. In both types of condensers, a terminal member, ordinarily in the form of a separate piece of foil, rod or wire composed of the same metal as the surfaces of the electrode, is secured to each electrode to provide for connection to external circuits. These terminal members lap over portions of each electrode; thus, the electrode and terminal assembly is in the lapping portions is of greater thickness than the remainder of the electrode. This variation in thickness is undesirable because the increase in thickness requires greater space for the condenser without any gain in capacity, and furthermore, the variations in thickness result in the formation of pockets in the complete assembly, providing areas where the electrolyte may flow away from the electrodes and spaces where gases may accumulate. Both of these effects are disadvantageous and may result in shortening the life of the condenser.

Another difficulty in the manufacture of electrolytic condensers occurs because of the fact that filming may take place between the electrode and the terminal, thus increasing the resistance to the flow of electricity to the electrode and reducing the efficiency of the condenser. In condensers in which the terminals are welded to the electrodes, difficulties have arisen because the spot welding operation always leaves a slight metallic deposit from the metallic electrode; this deposit frequently produces leakage in electrodes used as anodes. Thus, the problem of securing a proper electrical connection between terminal and electrode has been a serious one.

Accordingly, a general object of the present invention is the provision of an electrode and terminal assembly, particularly for electrolytic condensers, in which the above noted difficulties are eliminated. Another object is the provision

2 of an economical and efficient method for producing such assemblies. More specific objects of my invention are the provision of electrode and terminal assemblies in which the thickness of the overlapping parts of the electrode and terminal is substantially the same as the thickness of the remainder of the electrode; the provision of an electrode and terminal assembly wherein the bond between electrode and terminal is such as substantially to preclude the formation of dielectric films between the electrode and terminal; the provision of electrode and terminal assemblies particularly adapted for electrodes having surfaces of cohering metal particles; the provision of electrode and terminal assemblies wherein the connection between the electrode and terminal is substantially free from contamination; the provision of methods of bonding electrode and terminal assemblies to obtain the foregoing objects in the completed article; the provision of a method of bonding electrodes and terminal members by heat and pressure without contaminating the electrode or the assembly in the region of the bond.

Figure 2:
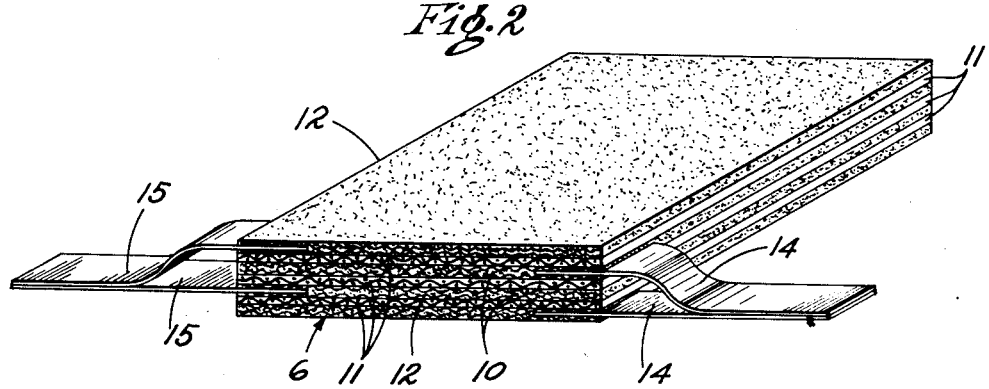
Figure 19:
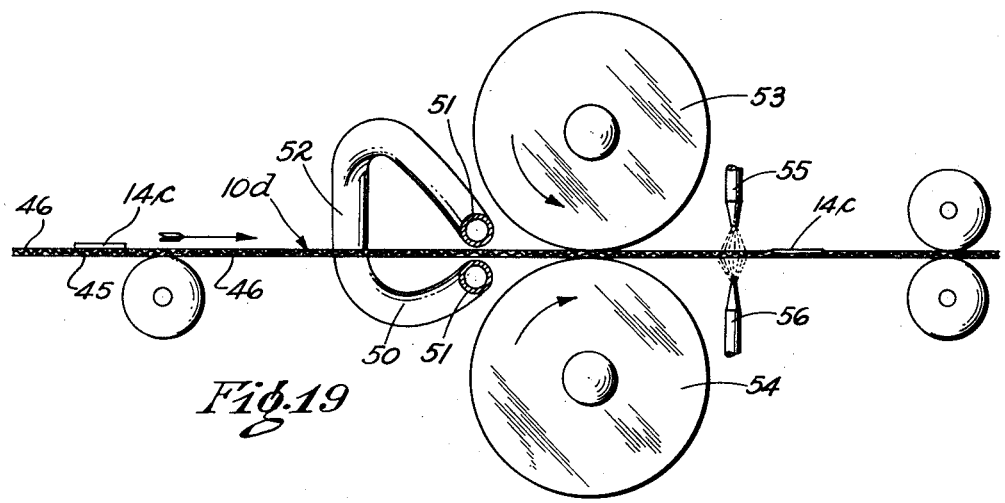
Figure 20:
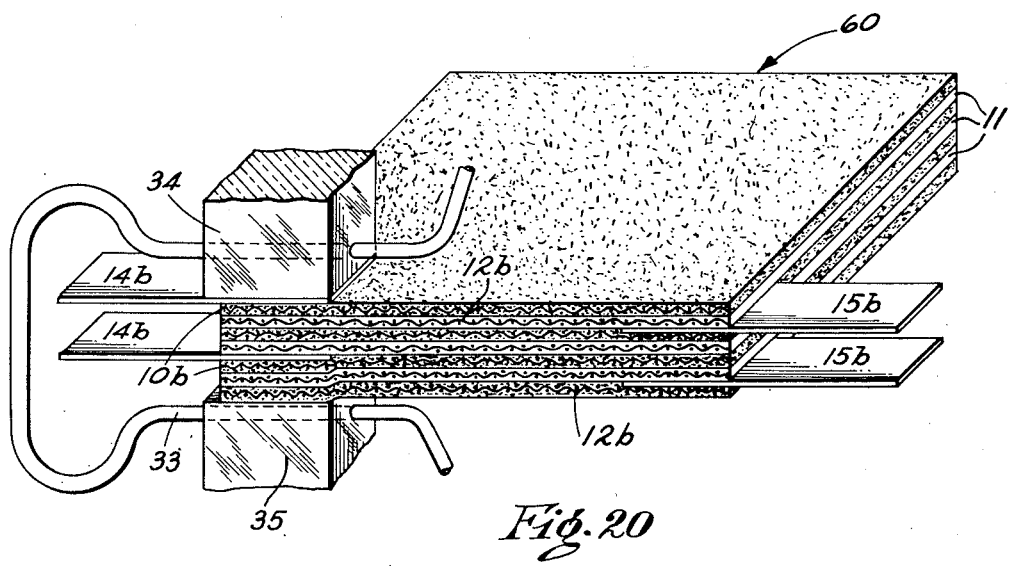

Further objects and advantages of my invention will become apparent from the following description of preferred forms thereof, reference being made to the accompanying drawings wherein Figure 1 is a perspective view illustrating a wound type of condenser embodying my invention, the condenser being partially opened to show the terminal construction; Figure 2 is a perspective view of a flat type of condenser embodying my invention; Figure 3 illustrates one type of electrode suitable for use in the condensers of Figures 1 and 2; Figure 4 is a sectional detail taken on the line 4—4 of Figure 3; Figures 5 and 6 illustrate steps in a preferred method of producing the assembly illustrated in Figures 3 and 4; Figure 7 illustrates another form of electrode and terminal assembly suitable for use in condensers of the types shown in Figures 1 and 2; Figure 8 is a sectional detail as indicated by the line 8—8 of Figure 7; Figure 9 illustrates one step in a preferred method of producing the assembly illustrated in Figures 7 and 8; Figure 10 illustrates still another form of electrode and terminal assembly suitable for use in the condensers of types shown in Figures 1 and 2; Figure 11 is a sectional detail as indicated by line 11—11 of Figure 10; Figures 12 and 13 illustrate steps in a preferred method of making the condenser of Figure 11; Figure 14 is a perspecitve view illustrating a still further modification of electrode and terminal assembly suitable for use in the condensers of the types shown in Figures 1 and 2; Figure 15 is a cross-sectional detail taken along the line 15—15 of Figure 14; Figure 16 is a diagrammatic illustration of one step of a continuous method of making electrode and terminal assemblies; Figure 17 is a section, on an enlarged scale, taken along line 17—17 of Figure 16; Figure 18 is a similar section showing the electrode and terminal of Figure 17 after the assembly operation has been completed; Figure 19 diagrammatically illustrates another step in the production of the assembly shown in Figure 18; and Figure 20 is a diagrammatic illustration of a method of simultaneously securing a plurality of terminals to their electrodes. The drawings are necessarily diagrammatic, the thickness of the electrodes, terminals, etc., being greatly exaggerated.

Briefly, the invention contemplates the provision of electrode and terminal assemblies in which the electrode itself is of a porous nature, the surface of the electrode comprising a conductive layer made up of a large number of minute cohering metallic particles, produced, for example, by spray depositing as described in my prior Patents Nos. 2,104,018 and 2,280,789, or by sintering or other convenient means, and having the portion of the terminal member which overlaps the electrode embedded in the electrode by the application of pressure in such manner that the combined thickness of the overlapping portions of the terminal and electrode is substantially the same as the thickness of the remainder of the electrode. Preferably, this reduction in thickness is accomplished by the application of heat and pressure by an operation akin to spot welding, or by the application of pressure to the assembly while the assembly is heated by high frequency heating; this last method is advantageous in that it does not require the engagement of the electrode or the terminal by metallic welding electrodes, and thus the possibility of contamination of the assembly by the welding electrodes is eliminated. The invention may take various forms, several of which are illustrated in the drawings.

A condenser of the wound or rolled type embodying my invention is indicated in general at 5 in Figure 1 of the drawings. This may be of conventional, substantially cylindrical form and is made up of an electrode 10, a spacer 11 composed of gauze or other suitable material, an electrode 12 and another spacer 11. A terminal 14 is secured to electrode 10 and a terminal 15 to electrode 12. The condenser is shown with the electrodes and spacers partially unwound for convenience in illustration. In use, the electrodes are wound completely into the cylindrical form in the conventional manner. The assembly is impregnated with a suitable film-maintaining electrolyte, preferably of the pastey or viscous type, and the whole enclosed in a suitable cover from which the terminal members project. Conventionally, one or both of the electrodes may be composed of film-forming material; in the present embodiment, the electrodes are shown as having surfaces composed of conductive layers of finely divided cohering metallic particles produced by sintering or by spray depositing a film-forming metal such as aluminum, magnesium or the like on a suitable flexible base of fibrous material. The electrodes themselves form no part of the present invention, reference being made to my aforesaid Patents Nos. 2,104,018 and 2,280,789 for a more complete description of preferred forms of electrodes and of the methods of making the same.

As indicated in the drawing, the terminal members 14 and 15 project beyond the edges of the respective electrodes 10 and 12 and also overlap the electrodes for a substantial distance to provide a low resistance path for the flow of electricity between the terminals and the conductive layers on the electrodes. It will be noted that the region of the electrode and terminal assembly indicated at 16 where the electrode 10 and the terminal 14 overlap is of substantially the same thickness as the remaining portion of the electrode 10; the portion 17 where the electrode 12 and terminal 15 overlap are similarly of substantially the same thickness as the thickness of the remaining portion of the electrode 12. By reason of this construction, the electrodes with their associated terminals can be rolled in the cylindrical form of the condenser without increasing the bulk of the condenser beyond that required by the electrodes and spacers alone, and without creating any spaces or pockets within the condenser. The elimination of the spaces or pockets eliminates the difficulties heretofore encountered because of the flow of electrolyte away from the electrodes and into the spaces or pockets, and the accumulations of gases in the spaces or pockets present in conventional prior condensers.

Figure 2 illustrates a condenser of the flat or stacked type embodying electrodes of the same construction. Here the condenser indicated in general at 6 is made up of two electrodes 10 with their associated terminals 14 and two electrodes 12 with their associated terminals 15, the electrodes being separated by spacers 11. The electrodes 10 are of one polarity and the electrodes 15 of the opposite polarity. Preferably, the condenser is arranged as shown with the terminals of opposite polarity projecting from opposite sides of the condenser and with the terminals 14 secured together and the terminals 15 secured together as by spot welding or other convenient means. The electrodes are of the same construction as previously described, although their dimensions are different, and as before the assembly may be impregnated with a suitable film-maintaining electrolyte and enclosed in a suitable case (not shown). The advantages of having the overlapping portions of the terminal and electrode assembly of substantially the same thickness as the remainder of the electrodes is particularly marked in a condenser of this type where many more than two electrodes of each polarity may be required, for with the present construction there is no substantial increase in thickness of the condenser in the regions of the connections between terminals and electrodes even though several plates of each polarity may be stacked in the condenser with several terminals superposed.

The condensers shown in Figures 1 and 2 are merely illustrative of two types of electrolytic devices in which my electrodes may be advantageously used. It will be appreciated that the invention may be adapted to various other types of condensers and to other related devices.

The construction of the electrodes 10 embodied in both types of condensers is illustrated in greater detail in Figures 3 and 4; inasmuch as the electrodes 12 are preferably of identical construction, they are not further described or illustrated herein. The electrodes 10 are each made up of strips 18 and 19 of flexible fibrous material such as open mesh textile gauze, perforated paper, woven or matted glass cloth, woven wire screen and the like. The strips of base material are provided with porous conductive layers 20 and 21 of finely divided cohering metallic particles, preferably by spraying molten metal thereon as described in my aforesaid patents. This operation provides the base strips with adherent surfaces of great effective area so that large capacity can be obtained in comparatively small space when the electrodes are incorporated in condensers. The electrodes are preferably of a porous nature throughout, and thus may be permeated by the electrolyte. The electrode constituting the anode of the condenser is provided with an electroformed dielectric film in the usual manner. The conductive layers 20 and 21 function to bond the two strips together, this being accomplished preferably by spraying molten metal on the assembled strips from opposite sides. In this form of the invention, one end of the terminal 14 is disposed between the two strips 18 and 19. The spray-deposited material making up the layers 20 and 21 is compacted in the region 16 where the terminal and electrode overlap. By compacting the conductive layers in this region, the thickness of the assembly is maintained at substantially the same thickness as the remaining part of the electrode, thus giving the advantageous results noted above. As noted above, the thickness of the parts is greatly exaggerated in the drawings; in actual practice the actual thickness of the terminal may be about 0.003" and the thickness of the electrode may be about 0.010". Of course, these thicknesses may be varied widely within the teachings of the invention.

A preferred method of producing the electrodes 10 is illustrated in Figures 5 and 6. According to this method, the strips 18 and 19 are first positioned face-to-face, with the terminal member 14 projecting between them. Then the spraying operation is carried out from both sides of the strip, producing the layers 20 and 21, bonding the strips together and bonding the terminal to the layers 20 and 21. The product of these operations is shown in Figure 5 wherein it will be noted that the thickness of the assembly in the region 16 exceeds the thickness of the remainder of the electrode by substantially the thickness of the terminal 14. The next step in the operation is illustrated in Figure 6 wherein the region 16 is subjected to heat and pressure to compact the conductive layers by applying thereto the electrodes 23 and 24 of a spot welding machine (not shown). Pressure is applied to the electrodes in the usual manner and a suitable welding current is caused to flow between the electrodes to compact and further weld together the spray-deposited particles and to weld the spray-deposited layers more securely to the terminal 14. The strength of the current, the duration of application of the current and the pressure employed are so correlated that at the conclusion of the welding operation, the thickness of the assembly in the region 16 is reduced substantially to the thickness of the remainder of the electrode 10. This operation not only makes the electrode 10 of the desired substantially uniform thickness throughout, but also provides a welded bond between the terminal 14 and the spray-deposited material on the electrode 10, the bond being of such a nature that it is impossible for electrolyte to penetrate between welded points of the terminal and the spray-deposited material. Thus, no filming can take place between the adjacent welded surfaces of electrode and terminal, and the possibility of increased resistance of the electrode-terminal connection resulting in reduced efficiency is eliminated.

Figures 7, 8 and 9 illustrate a modified form of electrode which may also be utilized in condensers of the types shown in Figures 1 and 2. Here the electrode 10a is composed of a single strip 27 of a flexible base material of the nature previously described, and the terminal 14a is composed of a strip of thin foil having a series of perforations 28 in the portion of the terminal which overlaps the electrode. The terminal 14a is embedded in the conductive layer 29 which is composed of finely divided cohering metallic particles as before. The material 29 extends into the perforations 28 to key the terminal member to the electrode as shown particularly in Figure 8.

This type of terminal and electrode assembly can be made by spraying the base material 27 to provide the conductive layer 29, then positioning the terminal member 14a as shown in Figure 9, and thereafter pressing the terminal into the layer 29 to produce the construction shown in Figure 7. Obviously more than one layer of base material may be provided. The perforated terminal 14a in such as case may be inserted between two base strips in the manner of the terminal 14 previously described, or may be disposed on one side of the two or more layers. While terminal members of this nature may be embedded in the porous metallic layers merely by the use of pressure, the assembly preferably is heated by electrical or other means.

Figures 10 and 11 show a further modification of the invention wherein the electrode 10b is made up of a strip of flexible fibrous material 31 having a conductive layer 32 of finely divided cohering metallic particles. Here the terminal 14b is imperforate and is embedded into one side of the electrode so that the total thickness of electrode and terminal where the two overlap is substantially the same as the thickness of the remainder of the electrode. This type of electrode and terminal assembly may be produced by spraying the base material 31 to provide the conductive layer 32 as before, positioning the terminal member 14b thereon as shown in Figure 12, and then applying heat and pressure to the overlapping portions in the manner heretofore described, or preferably as shown in Figure 13.

In the arrangement shown in Figure 13, which shows a preferred method of heating the parts, the heating is accomplished by inducing eddy currents in the metal of the electrode and terminal by a high frequency current flowing through the tubular conductor 33. Conductor 33 is connected through suitable leads to a source of high frequency current, and water or other suitable coolant is circulated therethrough to prevent overheating of the conductor and of the members 34 and 35. Pressure is applied to the heated material by members 34 and 35 which engage the surface of the terminal 14b and the electrode 10b, respectively; these members are preferably composed of a refractory dielectric material such as asbestos, fused quartz, glass, porcelain, or other refractory dielectric material which will not contaminate the subsequently produced condenser if traces of the material are left on the parts.

When the high frequency current flows through conductor 33, the induced eddy currents cause the metal of the terminal member 14b and the electrode 10b between the members 34 and 35 to become almost instantaneously heated to a welding temperature. At the same time, pressure is applied by means of the members 34 and 35 (which may be urged toward each other by any suitable mechanism such as a press) to embed the terminal 14b into the conductive layer 32 and to compact the material of the layer 32. The loop 36 in conductor 33 gives the conductor flexibility to permit the members 34 and 35 to be moved toward and away from each other. By these operations, the terminal 14b is securely bonded electrically and mechanically to the conductive layer 32, and the terminal is embedded in the electrode as shown in Figure 10 so that the total thickness of the terminal and electrode in the overlapping zone is reduced substantially to the thickness of the remainder of the electrode. The operation is preferably carried out to produce a weld between the terminal 14b and the conductive layer 32, yet this is accomplished without possibility of contamination, for the material making up the members 34 and 35 is such that it will have no deleterious effect when the electrodes are subsequently incorporated in a condenser. Thus, even if traces of the dielectric material are left on the surfaces of the terminal or electrode, no damage to the condenser will result. Also, the heat is generated in the metal so rapidly that the operation leaves the base material substantially intact, even when combustible materials such as textile materials, paper and the like are employed as bases upon which the metallic layers are deposited. It is to be understood that this method of applying heat and pressure may also be utilized in the manufacture of the electrodes 10 and 10a previously described, and in the manufacture of other types of electrodes and terminal assemblies.

Figures 14 and 15 illustrate still another modification of electrode which can be utilized with the condensers of Figures 1 and 2. Here the electrode 10c may be generally similar to the electrode 10b previously described, comprising a suitable base 41 with a conductive layer 42 thereon. The terminal 14c, however, is in this instance a wire having a straight portion for connection to an external circuit and a preferably curved or sinuous portion 43 embedded in the conductive layer 42. The operation of joining the wire to the electrode may be carried out by any one of the methods previously described, the high frequency heating method being particularly adapted for this type of assembly. Obviously, the wire terminal of Figures 14 and 15 may be employed with condensers made up of more than one layer of base material and may be disposed between two layers of base material arranged in the manner illustrated in Figures 3 and 4.

In Figures 16 to 20, I have illustrated a method whereby electrode and terminal assemblies may be made by a continuous operation. According to this form of my method, a large number of electrodes 10d may be made in the form of a continuous strip composed, for example of one or more layers of flexible fibrous material 45 having porous conductive layers 46 of finely divided cohering metallic particles thereon. The strip may be provided with the layers 46 by sprays of molten metal directed against opposite sides of the strip as the strip is moved, and preferably the strip is subjected to a film-forming operation before the terminal members 14d are secured thereto. By this sequence of operations, the forming operation can be carried out efficiently; the terminal members are subsequently secured to the strip at intervals selected to give the desired capacity for the separate electrodes into which the strip is subsequently cut.

As shown in Figure 17, the electrodes 14d are first secured to the strip by a clinching operation. This is carried out by punching openings 47 through the terminal members 14d and the electrode material, the tongues 48 produced by the punching operation being bent as shown to secure the terminals to the electrode material. Thereafter, the assembly of terminal and electrode are subjected to heat and pressure at least in the area where the terminals overlap the electrodes, and the terminals are embedded into the electrodes and welded to the metal particles making up the layers 46, producing the assembly shown in Figure 18. Then the strip is severed into lengths, each length including a terminal 14d, and the electrodes so produced may be incorporated into condensers or similar devices of any desired type. The customary aging treatment given to the electrodes after they are assembled into condensers will provide the surfaces of the terminals with dielectric films and will re-form any areas of the electrodes proper in which the dielectric film may have been damaged by the operations of securing the terminals to the strip and cutting the strip into separate electrodes.

The terminals are preferably bonded to the strip by an apparatus such as that shown diagrammatically in Figure 19 and consisting of a high frequency conductor 50 which is hollow to provide for water cooling as described in connection with the conductor 33. The conductor is supplied with high frequency current from a suitable source and has straight portions 51 which extend transversely across the strip 10d and are connected by a loop 52. The strip 10d, with the terminal members 14d clinched thereto, is moved continuously between the two straight legs 51 of the conductor, and a high frequency current is caused to flow therethrough, inducing high frequency eddy currents in the terminals and metal layers 46 and rapidly heating them. Immediately thereafter, while the metal is still hot, the strip passes between the rolls 53 and 54 which are rigidly supported and are arranged to bear lightly on the strip itself. The rolls thus slightly compact the heated metallic particles making up the layers 46, improving the strength and conductivity of the layers, and when one of the terminals 14d passes between the rolls, the terminal is embedded into the strip as indicated on the right-hand side of Figure 19, and as shown in Figure 18. Thus, the rolls, because of their rigid mounting, insure that the series of electrode and terminal assemblies making up the strip are all of substantially uniform thickness throughout.

Like the members 34 and 35, the rolls 53 and 54 are preferably composed of a refractory dielectric material such as asbestos, fused quartz, glass, porcelain or other material which will not contaminate the subsequently produced condenser if traces of the material are left on the parts. The strip is moved rapidly through the apparatus so that the metal retains sufficient heat to insure the welding of some of the particles to the terminal members by the pressure exerted by the rolls 53 and 54. The rapidity with which the heat is applied again prevents the destruction of the base materials on which the layers 46 are deposited. If desired, the strip may be cooled by water sprays from nozzles 55 and 56 disposed immediately beyond the rolls 53 and 54.

Figure 20 illustrates another modification of my method in which a plurality of terminals are bonded to their respective electrodes in a single operation. Here, reference character 60 indicates a condenser made up of a plurality of electrodes 10b and 12b which may, for example, be identical with the electrodes 10b shown in Figures 10 and 11, the electrodes being separated by spacers 11, terminals 14b are secured to electrodes 10b, while terminals 15b are secured to electrodes 12b.

In this form of the invention, the electrodes, terminals and spacers 11 are assembled together before the terminals are bonded to the electrodes. The assembly before bonding is as shown in the left-hand portion of Figure 20, the terminals 14b resting upon the surfaces of the electrodes 10b. An apparatus similar to that shown in Figure 13 and including members 34a and 35a and high frequency heating conductor 33a is used to bond the terminals to their respective electrodes. This is accomplished by disposing the apparatus as shown in Figure 20 with the ends of the members 34a and 35a in engagement with the condenser assembly in the areas where the terminals 14b overlap the electrodes 10b, then causing a high frequency current to flow through the conductor 33a and applying pressure by means of the members 34a and 35a. The high frequency currents induce high frequency eddy currents in the metal layers of the electrodes 10b, heating the metal sufficiently to permit the assembly to be compacted to the same thickness as the remaining portion of the condenser assembly and welding the terminals to their respective electrodes. Inasmuch as the heat is generated only in the metal where it is needed, this operation can be carried out without destroying the insulating layers between the electrodes. The final result is shown at the right-hand portion of Figure 20 where the electrodes 12b and their terminals 15b are bonded together with the terminals embedded in the electrodes so that the thickness of the condenser in the terminal region is substantially the same as the thickness of the other portions thereof.

In all forms of my invention, the assemblies may be quenched or sprayed with water to cool them immediately after each bonding operation, and if desired, the bonding operations may be carried out in a non-oxidizing atmosphere of helium or other inert gas to minimize the possibility of injury to the base material and to prevent undue oxidation of the metal.

From the foregoing description of preferred forms of my invention, it will be evident that I have provided electrode and terminal assemblies in which the terminals are securely bonded to the electrodes with good mechanical and electrical joints, and wherein the thickness of the overlapping portions of the assemblies is no greater than the thickness of the remainder of the electrodes. Thus, when the electrodes are incorporated in condensers, there are no spaces or pockets, and the difficulties heretofore caused by such spaces or pockets are eliminated. Furthermore, the bulk of the condenser is reduced as compared to present types of condensers wherein the terminal and electrode assembly is of greater thickness than the remainder of the electrode.

The invention is particularly adapted to condensers embodying relatively thin flexible electrodes composed of conductive layers of film-forming or other metal on suitable flexible bases, but may be adapted to condensers of other types. For example, it is useful in connection with electrodes composed of sintered masses of finely divided metallic particles or of sintered masses of metallic particles and inert particles or fibers. The terminal members may be composed of foil, wire, rod or of material similar to that making up the electrodes, depending upon the requirements of the particular installation, and the relative thickness of the various elements may be varied widely so long as the thickness of the electrode proper is sufficiently greater than the thickness of the terminal to permit the thickness of the overlapping portions of terminal and electrode to be reduced to the original thickness of the electrode.

It will also be evident that by the methods disclosed herein, my electrode and terminal assembly can be manufactured rapidly and economically. The operation of compacting the electrode to embed the terminal therein results in the production of a connection between terminal and electrode which is of permanent low resistance. Also, the density of the porous layer is increased where it is subjected to pressure. The high frequency heating method disclosed herein is advantageous in that there is no possibility of contamination from the electrodes, and the heating and depth of penetration of the terminal into the electrode can be accurately controlled. This phase of my method has application to the production of electrode and terminal assemblies of different types from those disclosed herein, and in the compacting of electrode materials generally, without necessarily joining terminals thereto.

Various changes and modifications in my invention, both in the method and in the article, may be made without departing from the spirit and scope thereof. Therefore, it is to be understood that my patent is not limited to the preferred forms disclosed herein or in any manner other than by the scope of the appended claims.

I claim:

1. An electrolytic condenser comprising a plurality of superposed electrodes having porous surfaces of finely divided cohering metallic particles, each electrode having a terminal tab secured thereto, the terminal tabs having portions projecting beyond the electrodes and portions lapping the electrodes, the lapping portions of the terminal tabs being embedded in the porous surfaces, the portions of the electrode lapped by the terminal tabs being compacted as compared to the remaining portions of the electrodes, the total thickness of the superposed electrodes being substantially the same where terminal tabs and electrodes lap as it is in the remaining portions of the condenser, the assembly made up of the superposed electrodes being impregnated with electrolyte.

2. A condenser according to claim 1 wherein the electrodes are rolled into substantially cylindrical form.

3. A condenser according to claim 1 wherein the electrodes are substantially flat.

4. A condenser according to claim 1 wherein a plurality of electrodes of one polarity and a plurality of electrodes of the opposite polarity are provided, and wherein the terminal members associated with electrodes of the same polarity are superposed.

5. The method of making electrode and terminal assemblies for electrolytic devices which includes the steps of providing an electrode having a porous conductive layer of cohering metal particles, positioning a metallic terminal member with a portion thereof overlying a portion of the surface of said electrode and another portion thereof projecting beyond an edge of the electrode, thereafter subjecting the superposed areas of the terminal and electrode to heat and pressure to reduce the thickness of such areas to substantially the same thickness as the remainder of the electrode and to bond the terminal to the conductive layer without substantially enlarging the superposed areas of terminal and electrode.

6. The method according to claim 5 wherein the overlapping portions of the terminal and electrode are subject to an electric resistance welding operation to compact the layer of metallic particles and bond the terminal thereto.

7. The method according to claim 5 including the steps of heating superposed portions of the terminal and electrode by high frequency induction heating and subjecting said portions to pressure to compact the spray deposited material and bond the terminal to the electrode.

8. The method of making electrode and terminal assemblies for electrolytic devices which includes the steps of providing a strip of base material, providing the strip with a porous conductive layer of cohering metallic particles, positioning a metallic terminal member with a portion thereof overlying said strip and another portion thereof projecting beyond an edge of the strip, and thereafter subjecting the superposed areas of the terminal and strip to heat and pressure to reduce the thickness of such portions to substantially the thickness of the remainder of the strip and to bond the terminal to the conductive layer without substantially enlarging such portions.

9. The method according to claim 8 wherein a plurality of terminals are disposed along the strip, the terminals and strip are heated by passing them through a high frequency field, and thereafter the strip is severed into a plurality of electrode and terminal assemblies.

10. The method according to claim 9 wherein the strip and terminals are passed continuously through the high frequency field and between pressure rolls immediately thereafter.

11. The method according to claim 10 wherein the terminal members are clinched to the strip before being subjected to heat and pressure.

12. The method according to claim 8 wherein the conductive layer is composed of film-forming metal and the layer is subjected to a film-forming operation before the terminal is assembled therewith.

13. The method of making electrode and terminal assemblies for electrolytic devices which includes the steps of disposing a terminal with a portion of its surface in contact with an electrode having a surface comprising a porous conductive layer of minute cohering metallic particles, and thereafter subjecting the contacting portions of terminal and electrode to pressure to embed the terminal in said layer without substantially increasing the area of the contacting portions whereby the total thickness of the contacting portions of electrode and terminal is reduced to substantially the thickness of the remainder of the electrode.

14. The method according to claim 13 wherein the conductive layer is spray deposited upon a flexible base and the terminal member is positioned in contact with the base before the spraying operation is carried out.

15. The method according to claim 13 wherein the terminal consists of a strip of foil which is perforated in the portion thereof in contact with the electrode and wherein the pressing operation causes the material of the conductive layer to extend into the perforations.

JOSEPH B. BRENNAN.

REFERENCES CITED

The following references are of record in the file of this patent:

UNITED STATES PATENTS

| Number | Name | Date |
| --- | --- | --- |
| 686,246 | Bachmann | Nov. 12, 1901 |
| 2,022,500 | Clark et al. | Nov. 26, 1935 |
| 2,146,029 | Schimkus | Feb. 7, 1939 |
| 2,179,545 | Edge | Nov. 14, 1939 |
| 2,251,913 | Brennan | Aug. 12, 1941 |
| 2,278,161 | Brennan | Mar. 31, 1942 |
| 2,280,789 | Brennan | Apr. 28, 1942 |
| 2,297,608 | Blackburn | Sept. 29, 1942 |
| 2,375,211 | Brennan | May 8, 1945 |
| 2,393,100 | Gallay | Jan. 15, 1946 |
| 2,404,824 | Booe | July 30, 1946 |

FOREIGN PATENTS

| Number | Country | Date |
| --- | --- | --- |
| 277,152 | Great Britain | Sept. 15, 1927 |
| 503,370 | Great Britain | Apr. 5, 1939 |
| 543,505 | Great Britain | Feb. 27, 1942 |